United States Patent [19]
Yokouchi

[11] Patent Number: 5,193,198
[45] Date of Patent: Mar. 9, 1993

[54] METHOD AND APPARATUS FOR REDUCED POWER INTEGRATED CIRCUIT OPERATION

[75] Inventor: Hideaki Yokouchi, Suwa, Japan
[73] Assignee: Seiko Epson Corporation, Tokyo, Japan
[21] Appl. No.: 696,460
[22] Filed: May 6, 1991
[30] Foreign Application Priority Data

| May 7, 1990 | [JP] | Japan | 2-117176 |
| Aug. 10, 1990 | [JP] | Japan | 2-213221 |
| Mar. 15, 1991 | [JP] | Japan | 3-51381 |

[51] Int. Cl.$^5$ .......................... H03K 3/01; H02M 3/07
[52] U.S. Cl. ........................ 395/750; 363/60; 365/226; 365/227
[58] Field of Search .................. 323/313, 314, 317; 364/707; 307/29, 48, 80, 85, 86, 28, 38, 142, 143; 363/60; 395/725, 750; 365/228, 229, 226, 227

[56] References Cited

U.S. PATENT DOCUMENTS

| 3,757,795 | 9/1973 | Anderson | 307/48 |
| 3,941,989 | 3/1976 | McLaughlin et al. | 395/750 |
| 3,980,935 | 9/1976 | Worst | 365/229 |
| 4,236,199 | 11/1980 | Stewart | 363/60 |
| 4,565,960 | 1/1986 | Takata et al. | 323/317 |
| 4,794,317 | 12/1988 | van Tran | 323/316 |
| 4,806,789 | 2/1989 | Sakihama et al. | 365/228 |
| 4,875,188 | 10/1989 | Jungroth | 307/29 |
| 4,890,051 | 12/1989 | Kim et al. | 323/313 |
| 4,990,847 | 2/1991 | Ishimaru et al. | 323/317 |
| 5,012,132 | 4/1991 | Wang | 365/226 |

OTHER PUBLICATIONS

Owen, "Voltage Generator for EPROMs", Electronic Product Design (G.B.) p. 28, Oct. 1981.

Primary Examiner—William H. Beha, Jr
Attorney, Agent, or Firm—Raymond J. Werner

[57] ABSTRACT

A battery-powered electronic system in which ICs of low and high voltage specifications can be operated simultaneously by a single low voltage power supply, wherein prolongation of battery life, miniaturization of the housing size and reduction of manufacturing costs are achieved. The present invention comprises a monolithically integrated charge pump circuit for boosting a power supply voltage so as to output a voltage greater than that of the power supply voltage, and a power supply multiplexor for selecting between the output of the charge pump circuit and the power supply voltage in accordance with a power supply select control signal. The output of the multiplexor is used as a supply voltage, for at least one other IC in the system. The voltage selection process is dynamically determined based on the time-varying requirements of system operation. A voltage regulation circuit may be used to provide control over the charge pump circuit output. Circuitry is disclosed for disabling charge pump operation, when such operation is unnecessary, to reduce power consumption.

18 Claims, 6 Drawing Sheets

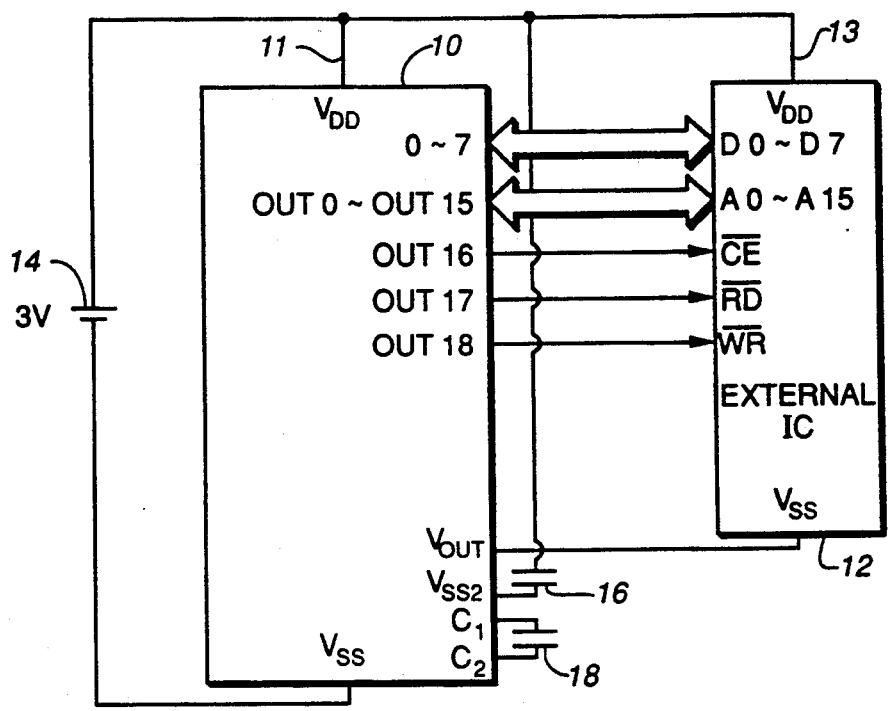
FIG._1
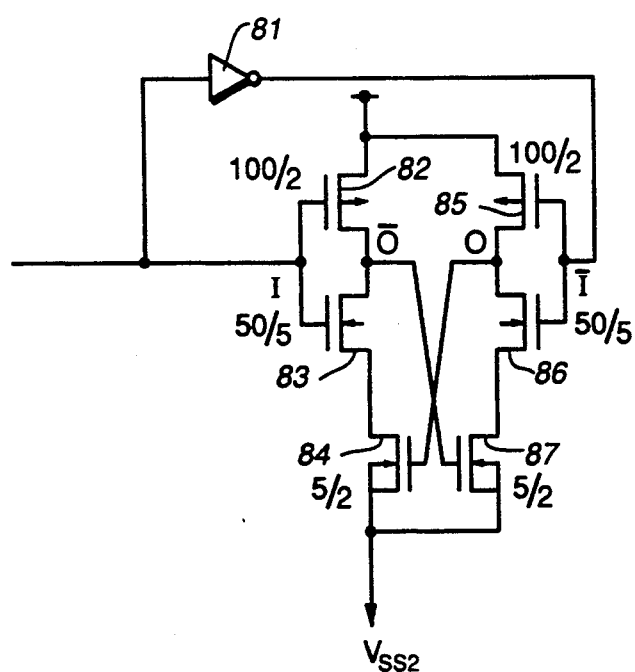
FIG._4

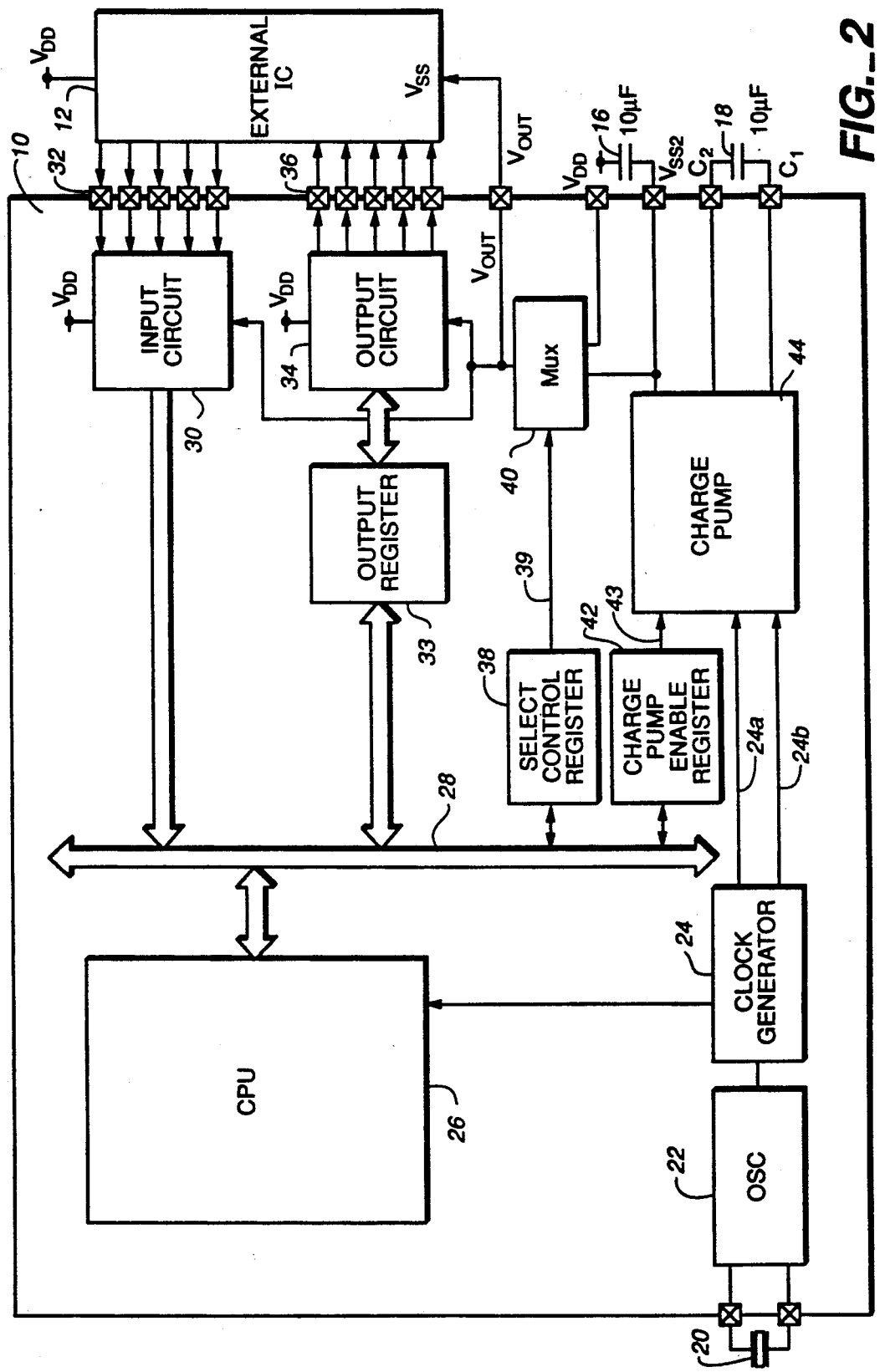

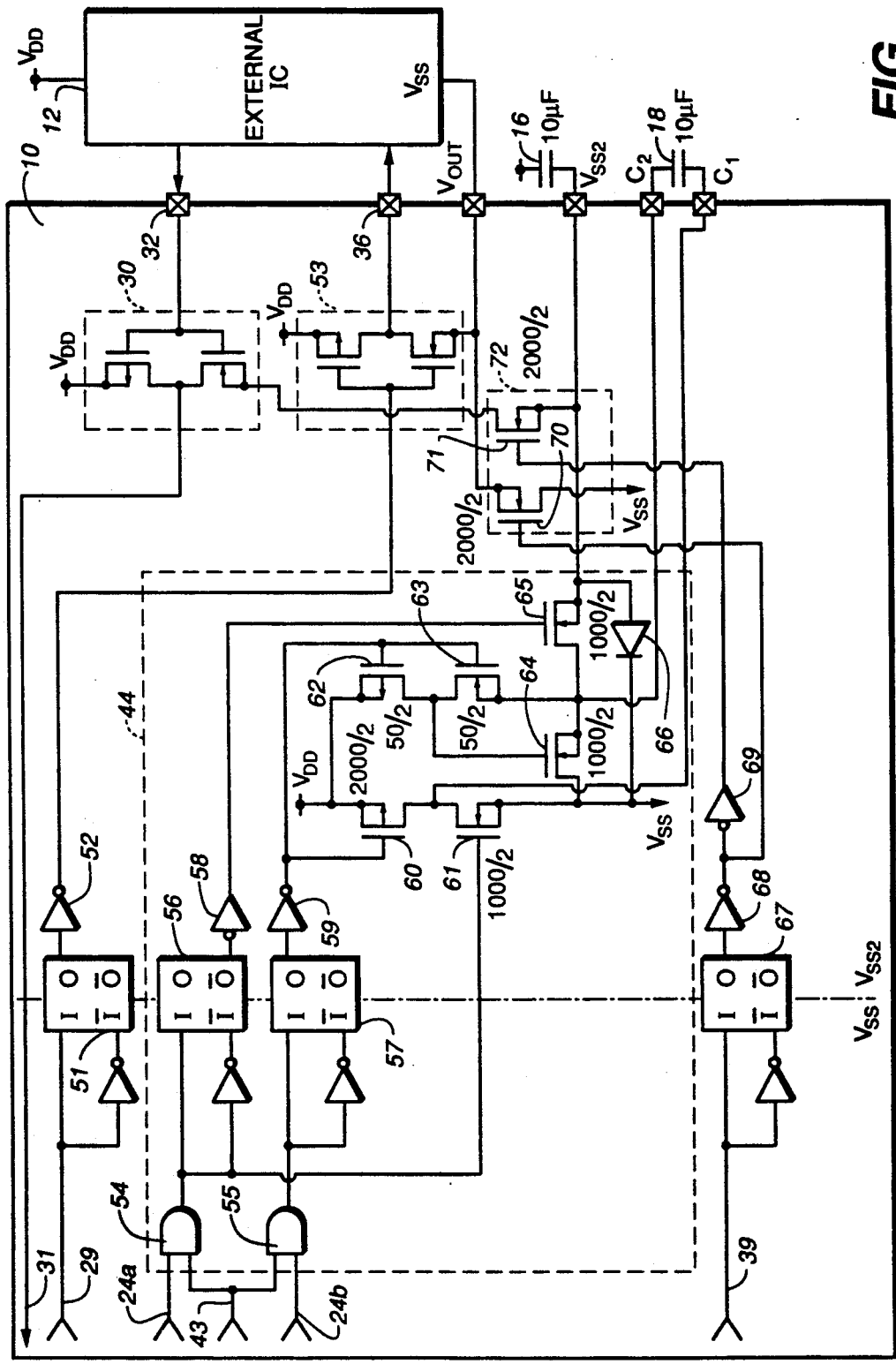
FIG._3

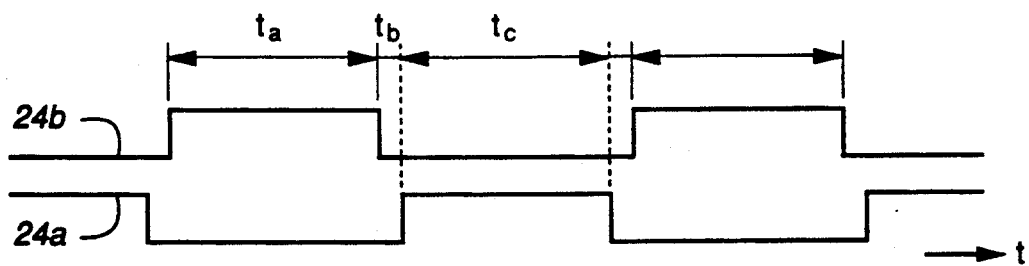
FIG._5
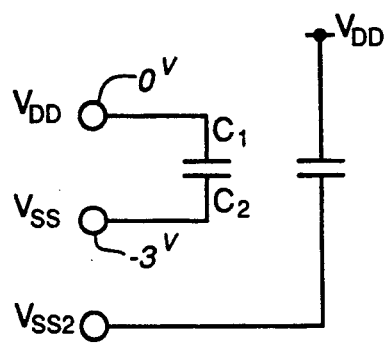
FIG._6
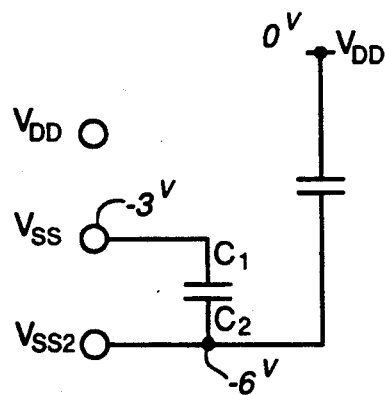
FIG._7

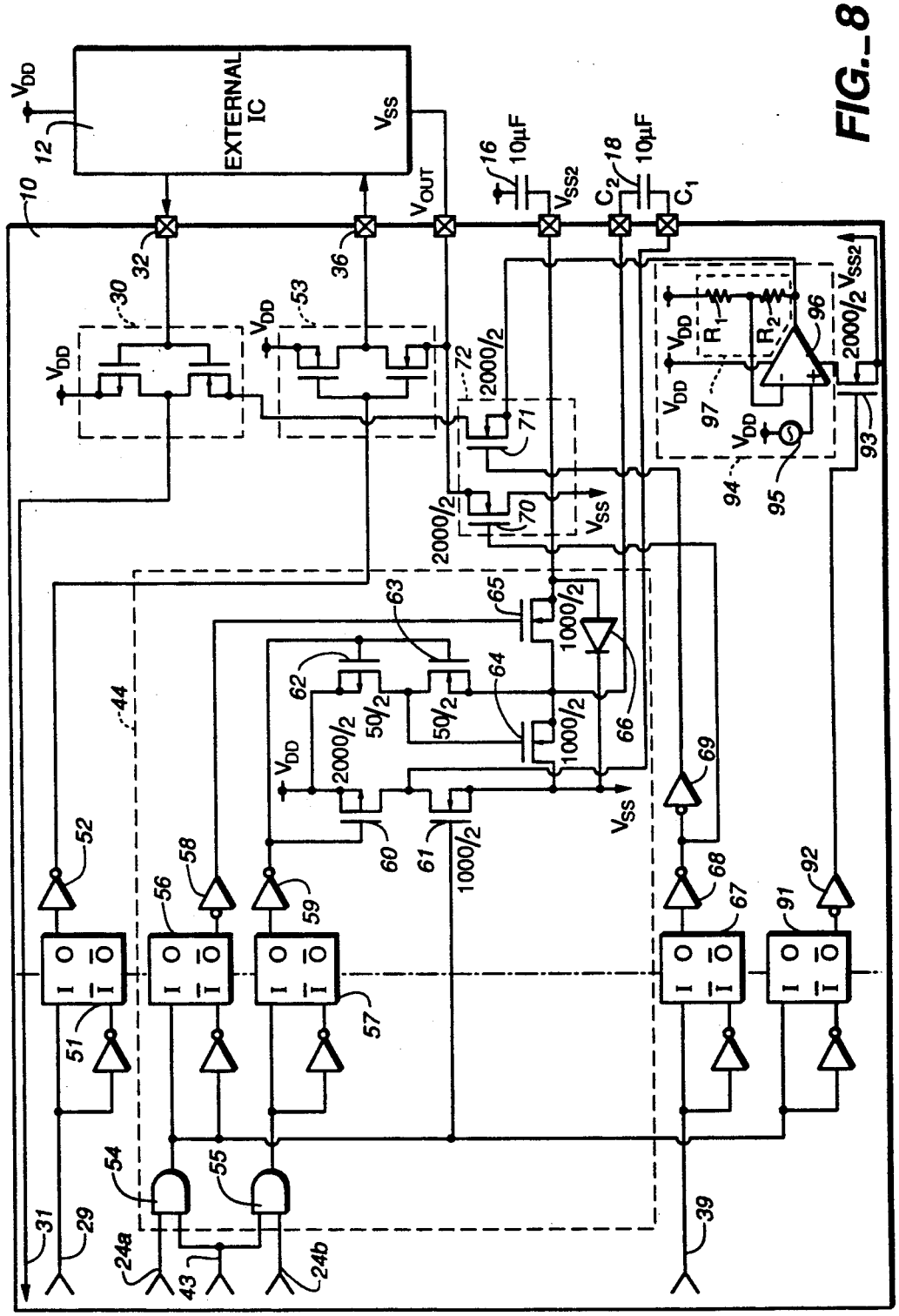
FIG._8

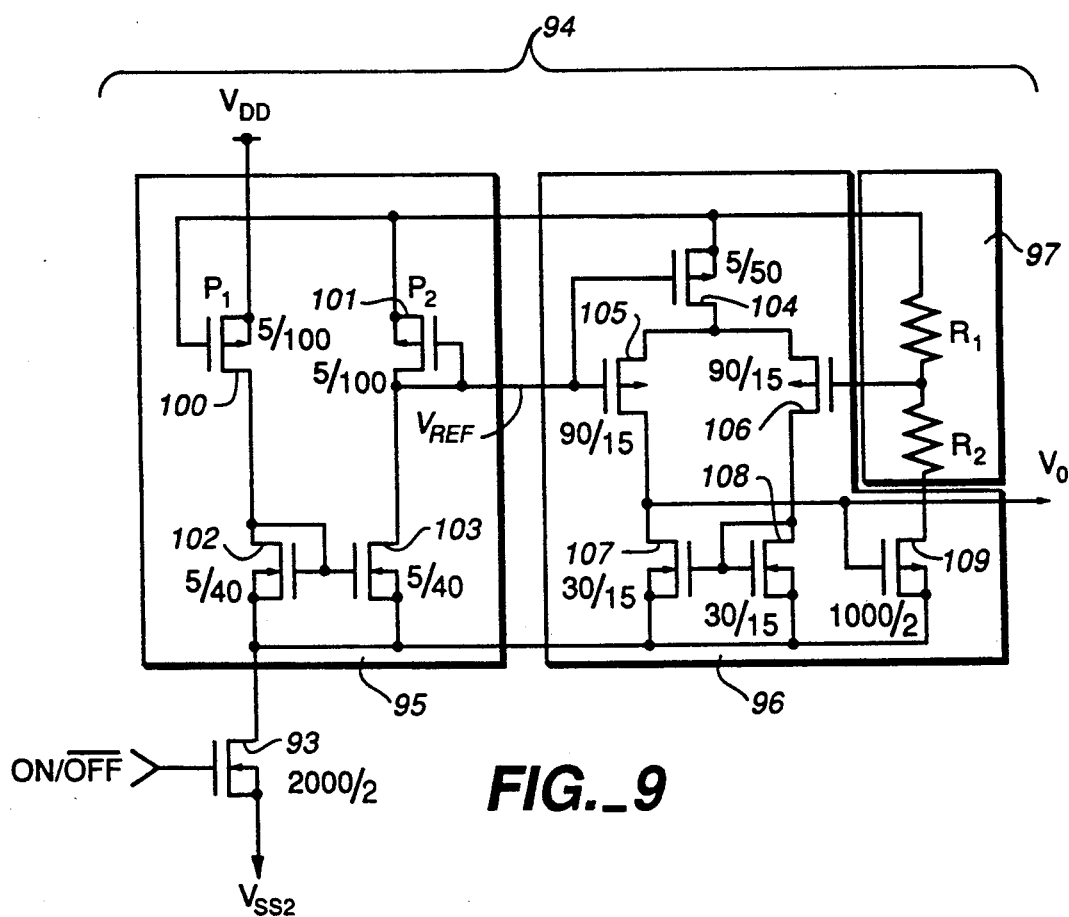
FIG._9

METHOD AND APPARATUS FOR REDUCED POWER INTEGRATED CIRCUIT OPERATION

BACKGROUND OF THE INVENTION

The present invention relates to integrated circuit power supply techniques for minimizing power consumption. More particularly, the present invention relates to generating a voltage supply by means of a circuit resident within a first integrated circuit, for powering additional peripheral chips, such as memory devices that operate at both high and low voltages.

In conventional electronic systems using a plurality of integrated circuits (ICs) it is typical to use a common voltage supply for each IC. For example these systems are typically built by grouping together and using only ICs of the 5 V or the 3 V type. This is done in order to simplify the system by reducing the power supply and wiring requirements inherent in a multiple supply design.

However, in low-power microcomputer systems, a problem exists with respect to segregating ICs by their power supply requirements. Many low-power microcomputers are designed to operate with a 3 V power supply so that they can be driven by one lithium cell, but generally available memory devices are typically designed for operation with a 5 V power supply. In a low-power electronic apparatus such as a battery-powered electronic notebook in which a microcomputer and an external memory device are combined, a power supply comprised of a pair of lithium cells connected in series is needed to provide the greater than 3 V power supply required by the memory. Therefore, in such an apparatus, current consumption is larger than that in a similar apparatus operated from a 3 V supply since the current used is a function of the voltage supply magnitude. As a consequence of higher power operation the life of batteries are shortened.

Additionally, most ICs of the 5 V type have an operating voltage specification of 5 V±10%. When using a pair of lithium batteries in series it is possible to produce a supply voltage of up to 7 V. Therefore, it has been necessary to provide a circuit for regulating the supply voltage, in a two battery system, to a value within the operating voltage range of these ICs. This regulator circuit is typically a separate IC. Use of a separate regulator IC is burdensome because the system becomes larger, and more costly to manufacture.

One approach to providing appropriate voltages without using a second battery cell has been to add a DC-DC converter IC to the system. The DC-DC converter can provide the voltage required by peripherals such as RAMs. However there are several problems with this approach. First, the additional DC-DC converter IC limits miniaturization of the system housing. Second, this additional chip increases manufacturing costs. Third, when the DC-DC converter output is used to power a peripheral chip, interfacing between chips with different supply voltages leads to a mismatch in logic levels. Fourth, there is a diode leakage pathway between the two voltage supply nodes which gives rise to battery-draining parasitic currents.

Any approach that requires more battery cells or more ICs means that miniaturization of the housing becomes difficult.

Therefore a need exists in low-power systems, for a means to combine ICs having different power supply requirements, with only one low voltage supply, such as a battery, in the system, while simultaneously eliminating the need for costly additional components that consume space and power. There further exists a need for a means to interface circuits having different logic level voltages while still ensuring noise margin.

SUMMARY OF THE INVENTION

It is an object of the present invention to provide circuitry, for battery-powered electronic systems in which ICs of low and high voltage specifications can be operated simultaneously by a single low voltage power supply, wherein prolongation of battery life, miniaturization of housing size and reduction of manufacturing costs are achieved.

Accordingly, the present invention comprises on a first IC, a monolithically integrated charge pump circuit for boosting an external supply voltage so as to output a voltage greater than that of the external supply, and a power supply multiplexor for selecting between the charge pump output and the external supply in accordance with a power supply select control signal. The output of the multiplexor is used as a supply voltage, to at least one other IC in the system, and also to those internal input and output circuits that interface with the other IC. The external IC(s) gain access to the multiplexor output voltage through an output terminal.

A voltage regulation circuit may be used to provide control over the charge pump circuit output. In this case, the external power supply is regulated into a constant voltage by the voltage regulator circuit and the regulator output becomes the input to the charge pump circuit. By using a regulator between the external supply and the charge pump input, the output voltage of the charge pump circuit is made stable. Alternatively, a voltage regulation circuit may be used on the output side of the charge pump. There is no particular advantage or disadvantage in choosing either configuration. Of, course, when this circuit is added, total current consumption is increased.

The voltage selection process is dynamically determined based on the time-varying requirements of system operation. For example, a low voltage will be selected to power an external memory IC when that IC is merely maintaining information, and a high voltage will be selected when the memory IC is being accessed for a read or a write cycle. More specifically, in a memory device such as a static RAM, a low voltage is required for holding data, while a high voltage is required for reading/writing data. When the static RAM is standing by, the low voltage power supply voltage, is connected to the power supply terminal through the power supply multiplexor circuit, but when reading or writing data, the high voltage output of the charge pump or the voltage regulator, is connected to the power supply terminal. The power supply multiplexor is switched according to need, thus realizing low current consumption.

An advantage of the present invention is the elimination of components used in previous approaches. For example, utilizing the present invention, only one battery is needed to operate a system that previously required either two batteries and a voltage regulator, or one battery and a DC-DC converter IC. Elimination of these components reduces manufacturing costs and permits miniaturization of the apparatus.

A further advantage of the present invention is the reduction in power consumption achieved by operating at high voltage only those circuit elements that require high voltage and only for the short periods of time when necessary for proper operation of those circuit elements.

According to a further aspect of the present invention, the charge pump circuit includes an enable/disable circuit for stopping the charge pump clocks. Therefore, the charge pumping operation can be stopped when it is not needed for proper system operation (e.g. high voltage operations will not be undertaken). In this way it is possible to realize additional reductions in current consumption.

According to another aspect of the present invention, the first IC further comprises an input circuit and/or an output circuit to which the driving voltage is supplied from the power supply multiplexor circuit. An interface between the first IC and the external IC is provided which has improved noise margin because the I/O circuits of the first IC operate from the same supply voltage as the external IC.

According to a still further aspect of the present invention, the system comprises a single-chip microcomputer and at least one memory device. The single-chip microcomputer includes a CPU, a charge pump circuit, an external accumulating capacitor and an external boosting capacitor, for boosting a power supply voltage, a power supply multiplexor circuit for selecting between the charge pump output and the power supply voltage in accordance with a voltage select control signal, at least one of an input circuit supplied with the multiplexor output voltage for supplying an input signal to the CPU and an output circuit supplied with the multiplexor output voltage for sending out a signal from the CPU, and a power supply terminal to which the multiplexor output voltage is supplied.

The external IC, which may be a memory device, is connected to at least one input and one output circuit of the single-chip microcomputer, and uses the selectable supply voltage output via the power supply terminal. When the external device is in stand-by mode the selectable supply voltage output provides a low voltage to the external IC as well as to the internal input and output circuits. However, when the external device is in active mode the selectable supply voltage output provides a high voltage to the external IC as well as to the internal input and output circuits.

BRIEF DESCRIPTION OF THE DRAWINGS

FIG. 1 is a block diagram illustrating the connectivity between ICs in one an embodiment of the present invention.

FIG. 2 is a block diagram illustrating some of the details of a low-power single-chip microcomputer embodying the charge pumping and voltage selection aspects of the present invention.

FIG. 3 is a circuit diagram, including transistor sizes, illustrating details of the charge pumping (boosting) circuit in the low-power microcomputer of FIG. 2.

FIG. 4 is a circuit diagram, including transistor sizes, illustrating the voltage level converter circuit.

FIG. 5 is a timing diagram illustrating the timing of the boosting clock signals used to drive the charge pump circuit.

FIG. 6 is a circuit diagram illustrating how the accumulating capacitor and boosting capacitor are electrically connected at time $t_a$ shown in FIG. 5.

FIG. 7 is a circuit diagram illustrating how the accumulating capacitor and boosting capacitor are electrically connected at time $t_c$ shown in FIG. 5.

FIG. 8 is a circuit diagram illustrating in detail the boosting circuit in the low-power microcomputer along with the voltage regulation aspect of the present invention.

FIG. 9 is a circuit diagram, including transistor sizes, illustrating the constant voltage circuit in the embodiment of FIG. 8.

DETAILED DESCRIPTION OF THE INVENTION

A system embodying the present invention is now described with reference to the drawings wherein like reference numerals refer to like parts throughout the drawings.

I. Circuit Connections

FIG. 1 shows a low-power single-chip microcomputer 10 and a 64K RAM (hereinafter referred to as "external IC",) 12 connected to each other by means of data lines and control lines. A DC power supply 14, having a first and second terminal wherein the first terminal is positive with respect to the second terminal, is included in the system such that the positive supply terminal is connected to the respective $V_{DD}$ power supply terminals 11, 13 of single-chip microcomputer 10 and external IC 12. The negative terminal of DC power supply 14 is connected to power supply terminal $V_{SS}$ of single-chip microcomputer 10.

Accumulating capacitor 16 is connected between the positive terminal of DC power supply 14 and the power supply terminal $V_{SS}$ of single-chip microcomputer 10, and boosting capacitor 18 is connected between terminals C1 and C2. In the preferred embodiment both capacitors are approximately 10 microFarad. Microcomputer output terminal VOUT, is connected to power supply terminal $V_{SS}$ of external IC 12.

FIG. 2 illustrates further detail of single-chip microcomputer 10 wherein oscillator circuit 22 in conjunction with crystal 20 supplies an output oscillation signal to clock generator 24. Clock generator 24 generates timing signals in accordance with the oscillation signal, and supplies one of those timing signals to CPU 26. CPU 26 receives input data from input circuit 30 through data bus 28. Input circuit 30 is connected to input terminal 32, and input terminal 32 is connected to external IC 12. In other words, input circuit 30 receives data from external IC 12 through input terminal 32.

Operation results from CPU 26 are transferred to output register 33 by means of data bus 28 so as to make output register 33 supply the operation result stored therein to output circuit 34 at a predetermined time. Output circuit 34 is connected to output terminal 36 so as to supply data to external IC 12.

Power supply select control register 38 receives and stores power supply signal 39 supplied from CPU 26 through data bus 28, and outputs power supply select control signal 39 to power supply multiplexor circuit 40 to control the operation of multiplexor circuit 40.

Charge pump enable register 42 receives and stores boost control signal 43 supplied from CPU 26 through data bus 28.

Charge pump circuit 44 is connected to accumulating capacitor 16 through terminal $V_{SS2}$, and connected to boosting capacitor 18 through terminals C1 and C2. Charge pump circuit 44 is supplied with charge pump enable signal 43 from charge pump enable register 42 and boosting clock signals 24a, 24b from clock generator 24. Charge pump circuit 44 boosts the power supply voltage and supplies the boosted voltage to power supply multiplexor circuit 40.

Power supply multiplexor 40 receives a select control signal 39, and two power supplies as inputs, one power supply is the voltage applied to terminal $V_{SS}$, and the second is the boosted voltage from charge pump circuit 44. Power supply multiplexor 40 produces as its output (the driving voltage), a selected one of its two inputs based on the state of select control signal 39. The output of power supply multiplexor 40 is connected to terminal $V_{OUT}$. The output of power supply multiplexor 40 is also connected to interface input and output circuits 30, 34.

The details of output circuit 34, are shown in FIG. 3. Output circuit 34 is comprised of voltage level conversion circuit 51, inverter 52 and output transistor circuit 53 which is comprised of a pair of FETs.

Charge pump circuit 44, shown in FIG. 3, is comprised of AND gates 54, 55, voltage level conversion circuits 56, 57, inverters 58, 59, MOSFETs 60, 61, 62, 63, 64, 65 and diode 66.

Multiplexor circuit 40, shown in FIG. 3, is comprised of a voltage level conversion circuit 67, inverters 68, 69 and a switching circuit 72 which itself is comprised of a pair of MOSFETs 70, 71.

FIG. 4 shows configuration details of the voltage level conversion circuits 51, 56, 57 and 67. Each voltage level conversion circuit is comprised of an inverter 81 and MOSFETs 82, 83, 84, 85, 86, 87. The source of MOSFET 84 is connected to a charge pump output terminal $V_{SS2}$. For example, in voltage level conversion circuit 56, if a clock signal of $-3$ V is supplied to an input terminal I thereof, a clock signal of $-6$ V is extracted from an output terminal thereof.

II. Circuit Operation

Charge Pump/Voltage Boosting Circuit

The present invention includes a monolithically integrated means of producing a DC power supply voltage greater in magnitude than the external power supply. In one embodiment of the present invention a charge pumping type circuit is used to produce this new DC power supply voltage, which is typically about twice the magnitude of the external supply.

This new voltage is used when required to interface with other system elements. External RAM chips, for example, may require a higher voltage to read and write than they do simply to maintain data. Since lower power consumption, and hence longer battery life are achieved via the use of lower supply voltages, it is advantageous to equip the system with one low voltage supply and generate a higher voltage low current supply for those occasions that warrant higher voltage operation.

FIG. 5, shows the timing of boosting clocks 24a, 24b which are output from clock generator 24. Boosting clocks 24a, 24b are generated so as to be non-overlapping. Three distinct timing regions, $t_a$, $t_b$, and $t_c$, can be seen in FIG. 5. In time region $t_a$, boosting clock 24a is low, and 24b is high. In time region $t_b$, boosting clock 24a is low, and 24b is low. In time region $t_c$, boosting clock 24a is high, and 24b is low. If both clocks 24a, 24b were allowed to go high simultaneously, boosting capacitor 18 would be effectively shorted out.

To enable charge pump circuit operation, charge pump enable signal 43, which is output from charge pump enable register 42, should be logically high. Table I shows the ON/OFF state of the transistors in the charge pump circuit at the times $t_a$, $t_b$, and $t_c$.

TABLE I

| TIME = $t_a$ | TIME = $t_b$ | TIME = $t_c$ |
|---|---|---|
| MOSFET 60- ON | MOSFET 60- OFF | MOSFET 60- OFF |
| MOSFET 61- OFF | MOSFET 61- OFF | MOSFET 61- ON |
| MOSFET 62- ON | MOSFET 62- OFF | MOSFET 62- OFF |
| MOSFET 63- OFF | MOSFET 63- ON | MOSFET 63- ON |
| MOSFET 64- ON | MOSFET 64- OFF | MOSFET 64- OFF |
| MOSFET 65- OFF | MOSFET 65- OFF | MOSFET 65- ON |

At time $t_a$ boosting clocks 24a, 24b are supplied to voltage level conversion circuits 56, 57 through AND gates 54, 55 respectively, and the output of AND gate 54 also drives the gate of MOSFET 61. Clock signal 24a, after being level-converted by voltage level conversion circuit 56, is supplied to the gate of MOSFET 65 through inverter 58. Clock signal 24b, after being level-converted by voltage level conversion circuit 57, is supplied through inverter 59 to the respective gates of MOSFETs 60, 62, 63.

With clock signals 24a, 24b in the time=$t_a$ state, MOSFETs 61, 63, 65 are turned OFF, and MOSFETs 60, 62, 64 are turned ON. As a result, a closed circuit is formed through the power supply terminal $V_{DD}$, MOSFET 60, terminal C1, boosting capacitor 18, MOSFET 64, and power supply terminal $V_{SS}$. By the formation of this closed circuit, a charging current is supplied from DC power supply 14 to boosting capacitor 18.

FIG. 6 shows the state of connection of accumulating capacitor 16 and boosting capacitor 18 at time $t_a$. Boosting capacitor 18 is charged so that the voltage across it is equal to the voltage of DC power supply 14. At this time, the boosting power supply terminal $V_{SS2}$ of accumulating capacitor 16 is opened to DC power supply 14.

At time $t_b$, as shown in FIG. 5, the potential of boosting clock 24a is changed, so that MOSFETs 60, 61, 62, 64, 65 are turned OFF leaving only MOSFET 63 turned ON. Under such conditions both accumulating capacitor 16 and boosting capacitor 18 are opened to DC power supply 14.

At time $t_c$, as shown in FIG. 5, the respective potentials of boosting clocks 24a, 24b are reversed from their values at time $t_a$. This results in MOSFETs 60, 62, 64 being OFF, and MOSFETs 61, 63, 65 being ON. Consequently, a closed circuit is formed through power supply terminal $V_{DD}$, accumulating capacitor 16, boosting output terminal $V_{SS2}$, MOSFET 65, terminal C2, boosting capacitor 18, terminal C1, MOSFET 61, and power supply terminal $V_{SS}$. FIG. 7 shows how accumulating capacitor 16 and boosting capacitor 18 are electrically connected at time $t_c$. When the electrical connections described herein are made, charge stored in boosting capacitor 18 is discharged to $V_{ss}$, thus creating a short-lived charging current in accumulating capacitor 16.

By repeating the cycle described above, the potential of boosting output terminal $V_{SS2}$ becomes approximately twice the potential difference between $V_{ss}$ and $V_{dd}$ or about $-6$ V in this example. The voltage available at boosting output terminal $V_{SS2}$ can be supplied through MOSFET 71 to input circuit 30, output transistor circuit 53 and external IC power supply terminal $V_{OUT}$. This is accomplished when power supply select control signal 39, which originates from power supply select control register 38, is level-converted by means of voltage level conversion circuit 67, and the level-converted voltage select control signal is supplied to the gates of MOSFETs 70, 71 by means of inverters 68, 69 so that MOSFET 71 is in an ON state. It follows that input circuit 30, output circuit 34 and external IC 12 can be driven by the 6 V power supply.

The interface-level-matching between a 3 V system ($V_{SS}$ system) and a 6 V system ($V_{SS2}$ system) in charge pump circuit 44, output circuit 34 and power supply multiplexor circuit 40 is performed by voltage level conversion circuits 51, 56, 57 and 67 shown in FIG. 3. The purpose of the voltage level conversion circuits is to convert low voltage amplitude signals, (e.g. 3 V), to high voltage amplitude signals (e.g. 5 V). No level conversion circuit is provided in input circuit 30. The 6 V input signal amplitude presented to input circuit 30 from the external IC is connected to the gate of a MOSFET (not-shown) which itself is connected across the low voltage supply of the 3 V $V_{SS}$ system. Typically, a voltage in the neighborhood of 6 V poses no problem, such as dielectric breakdown, for the MOSFET and therefore no reason exists to level shift the input voltage to a lower value. However, if any gate in this circuit cannot tolerate an applied voltage in the neighborhood of 6 V, then it would be necessary to provide the voltage level conversion circuit of FIG. 4, in input circuit 30.

When charge pump enable signal 43 and power supply select control signal 39 become logically low signals (OFF signals), charge pump circuit 44 stops its charge pumping operation, and MOSFETs 70, 71 become ON and OFF respectively, so that the nominal 3 V supply is connected to input circuit 30, output transistor circuit 53 and external IC power supply terminal $V_{OUT}$.

Input noise margin is assured because input circuit 30 and output circuit 34 operate with the same voltage as the external IC 12. That is, not only is the voltage level is optimized to operate the external IC 12 with low power consumption, but an improved interface with respect to noise margin is provided.

In the above-described embodiment, charge pump enable signal 43 and power supply select control signal 39 are produced independently of each other so that charge pump enable signal 43 can be produced first. This provides for the stabilization of the charge pump circuit 44 output prior to its use.

If the operating time until the stabilization is established is very short, then charge pump enable signal 43 and power supply select control signal 39 may be one and the same signal.

In this case, MOSFET 93 is not necessary, and the source of MOSFET 102 is connected to power supply terminal $V_{SS}$.

III. The Present Invention with a Constant Voltage Source

The present invention may also include the use of a voltage regulation circuit, for example the constant voltage circuit shown in FIG. 9 and described in detail below, to provide a stable output voltage. In this case, a substantially constant output voltage can be obtained by a constant voltage (voltage regulation) circuit even if the external power supply varies over a broad range. Therefore, the voltage supplied to the external IC power supply terminal $V_{OUT}$ is stable. This feature is particularly important if the operating voltage range specification of the external IC is narrow.

Another embodiment of the present invention, which includes a constant voltage circuit, is shown in FIG. 8. This IC includes voltage level conversion circuit 91, which receives the output of AND gate 54 as its input. The output of voltage level conversion circuit 91 is supplied through inverter 92 to the gate of MOSFET 93. The drain of MOSFET 93 is connected to constant voltage circuit 94, and the source of MOSFET 93 is connected to terminal $V_{SS2}$.

FIG. 9 shows the detailed configuration of constant voltage circuit 94. Constant voltage circuit 94 is comprised of reference voltage generation circuit 95, differential amplifier 96 and feedback amplifier resistor 97.

Reference voltage generation circuit 95 is comprised of MOSFETs 100, 101, 102, 103 of which MOSFETs 100, 101 are depletion type MOSFETs. The threshold voltage of the depletion type MOSFETs is preferably about −0.55 V Differential amplifier 96 is comprised of MOSFETs 104, 105, 106, 107, 108. Feedback amplifier resistor 97 is comprised of resistors R1 and R2 so that a signal related to the output voltage of differential amplifier 96 is fed back to differential amplifier 96.

In one embodiment, the gate materials of MOSFETs 100 and 101 are P-type Poly-Si and N-type Poly-Si respectively, and MOSFETs 100, 101 are the same in their transistor size, substrate density (i.e. substrate doping concentration), and the like. The work function difference between the P-type Poly-Si and the N-type Poly-Si, $V_{ref}$ (about 1.05 V), is output from reference voltage generation circuit 95 as ($V_{DD}-V_{ref}$). Differential amplifier 96 receives the output of reference voltage generation circuit 95 as a reference signal to thereby perform differential amplification, so that differential amplifier 96 outputs a constant voltage output $V_0 = V_{ref}(R_1+R_2)/R_1$.

Therefore, by setting this constant voltage output $V_0$ to, for example, 5 V, the voltage −5 V is applied through a MOSFET 71 to input circuit 30, output transistor circuit 53 and external IC 12 respectively, so that they are driven by this regulated voltage.

It will be readily apparent to those skilled in the art that provision of a constant voltage circuit 94, will enhance system operation when the external power supply varies over a broad range. Particularly when the operating voltage range specification of an external IC is narrow, it is possible to make it operate stably by providing to the external IC power supply terminal $V_{OUT}$ a well-regulated supply voltage.

Although, an input terminal and an output terminal are provided in the above embodiment, the present invention can be applied to situations in which only one terminal is provided for common use as an input and an output.

Integration of the present invention into a microcomputer is particularly effective because control means for a charge pump circuit, a power supply multiplexor circuit and so on can be easily realized in the form of software.

While the invention has been described in conjunction with several specific embodiments, it will be evident to those of ordinary skill in the art that many further alternatives, modifications and variations will be apparent in light of the foregoing description. Thus, the invention described herein is intended to embrace all such alternatives, modifications, applications and variations that may fall within the spirit and scope of the appended claims.

What is claimed is:

1. An integrated circuit comprising:
   a) a charge pump circuit, connected to a first power supply voltage node, for producing a boosted power supply voltage as an output; and
   b) a power supply multiplexer circuit, having said charge pump output and said first power supply voltage node connected as inputs, for selecting between said charge pump output and said first power supply voltage node to thereby output a selected one of said inputs;
   c) a power supply terminal for supplying said power supply multiplexer output to other integrated circuits provided externally; and
   d) at least one input circuit having power supply terminals wherein said multiplexer output voltage is connected to supply power to said input circuit.

2. The integrated circuit of claim 1 further comprising at least one output circuit having power supply terminals wherein said multiplexer output voltage is connected to supply power to said output circuit power supply terminals.

3. The integrated circuit of claim 1 wherein said charge pump circuit includes an enable/disable circuit for discontinuing operation of said charge pump circuit.

4. An integrated circuit comprising:
   a) a constant voltage circuit connected to an external power supply for outputting an internal power supply voltage of a substantially constant value;
   b) a charge pump circuit connected to said internal power supply voltage to thereby output a voltage higher than said internal power supply voltage; and
   c) a power supply multiplexor circuit, having said charge pump output and said power supply voltage connected as inputs, for selecting between said charge pump output and said power supply voltage to thereby output a selected one of said inputs.

5. An integrated circuit comprising:
   a) a charge pump circuit connected to a power supply voltage to thereby output a voltage higher than said power supply voltage;
   b) a constant voltage circuit connected to said charge pump output for outputting a substantially constant voltage higher than said power supply voltage; and
   c) a power supply multiplexor circuit for selecting between the output of said constant voltage circuit and said power supply voltage in accordance with a voltage select control signal supplied thereto to thereby output, a selected one of the output voltage of said constant voltage circuit and said power supply voltage.

6. The integrated circuit of claim 5 further comprising a power supply terminal for supplying said driving voltage from said power supply multiplexor circuit to external integrated circuits.

7. The integrated circuit of claim 6 further comprising at least one input circuit to which said driving voltage is supplied from said power supply multiplexor circuit.

8. The integrated circuit of claim 6 further comprising at least one output circuit to which said driving voltage is supplied from said power supply multiplexor circuit.

9. The integrated circuit of claim 5 wherein said charge pump circuit includes an enable/disable circuit for discontinuing charge pump operation.

10. A low-power electronic system comprising:
    a) a single-chip microcomputer having a CPU, a charge pump circuit connected to a power supply voltage for producing a voltage greater than said power supply voltage, a power supply multiplexor circuit for selecting between the output voltage of said charge pump circuit and said power supply voltage in accordance with a voltage select control signal supplied thereto to thereby output, as a driving voltage, a selected one of of said charge pump output and said power supply voltage, at least one of an input circuit supplied with the driving voltage from said power supply multiplexor circuit for supplying an input signal to said CPU and an output circuit supplied with the driving voltage from said power supply multiplexor circuit for sending out an output signal from said CPU, and a power supply terminal to which said power supply multiplexor output is supplied; and
    b) a memory device connected to said input and output circuits of said single-chip microcomputer, and supplied with said driving voltage from said power supply terminal.

11. The system of claim 10 wherein said single-chip microcomputer further comprises a power supply control multiplexor register for storing said voltage select control signal supplied from said CPU and for supplying said voltage select control signal to said power supply multiplexor circuit.

12. The system of claim 10 in which said single-chip microcomputer further includes a power supply control multiplexor register for storing a charge pump enable signal supplied from said CPU and for supplying said charge pump enable signal to said charge pump circuit.

13. The system of claim 10 wherein said single-chip microcomputer further includes voltage level conversion circuits connected between said single-chip microcomputer and a lower voltage circuit system and between said single-chip microcomputer and a high voltage circuit system.

14. A method of reducing power consumption in an electronic system having a low voltage power supply and at least two integrated circuits, portions of which are operable at low voltage for certain functions and require high voltage for other functions, comprising the steps of:
    a) generating a high voltage power supply from said low voltage power supply within a first one of said at least two integrated circuits;
    b) determining, within said first integrated circuit when said high voltage is required for proper system operation;
    c) switching a power supply multiplexer circuit output from said low voltage power supply to said high voltage power supply; and
    d) supplying said high voltage power supply to a second one of said at least two integrated circuits and to a first portion of said first integrated circuit; wherein said first portion comprises interface circuitry for communicating with said second integrated circuit, and said interface circuitry is electrically connected to said second integrated circuit.

15. The method of claim 14, further comprising the steps of:
    a) determining when low voltage operation will result in power consumption savings; and b) switching from said high voltage power supply to said low voltage power supply to drive said circuit elements.

16. A method of reducing power consumption in an electronic system having a low voltage power supply and at least two integrated circuits, portions of which are operable at low voltage for certain functions and require high voltage for other functions, comprising the steps of:
 a) regulating said low voltage supply to produce a substantially constant voltage output;
 b) generating a high voltage power supply from said substantially constant voltage output within a first one of said at least two integrated circuits;
 c) determining, within said first integrated circuit when said high voltage is required for proper system operation;
 d) switching a power supply multiplexer circuit output from said low voltage power supply to said high voltage power supply; and
 e) supplying said high voltage power supply to a second one of said at least two integrated circuits and to an interface circuit within said first integrated circuit;
 wherein said interface circuit communicates with said second integrated circuit, and said interface circuit is electrically connected to said second integrated circuit.

17. A method of reducing power consumption in an electronic system having a low voltage power supply and at least two integrated circuits, portions of which are operable at low voltage for certain functions and require high voltage for other functions, comprising the steps of:
 a) generating a high voltage power supply from said low voltage power supply within a first one of said at least two integrated circuits;
 a) regulating said high voltage supply to produce a substantially constant high voltage output;
 c) determining, within said first integrated circuit when said substantially constant high voltage is required for proper system operation;
 d) switching a power supply multiplexer circuit output from said low voltage power supply to said substantially constant high voltage power supply; and
 e) supplying said high voltage power supply to a second one of said at least two integrated circuits and to a first portion of said first integrated circuit;
 wherein said first portion comprises interface circuitry for communicating with said second integrated circuit, and said interface circuitry is electrically connected to said second integrated circuit.

18. The method of claim 17 further comprising the step of disabling operation of high voltage generation circuitry when said operation is not required for proper system operation and cessation will result in power savings.

* * * * *